(No Model.)

H. STRAWSON.
NON-REFILLABLE BOTTLE.

No. 606,309. Patented June 28, 1898.

Witnesses
T. L. Mockabee
Victor J. Evans

Inventor
Henry Strawson,
by John Wedderburn
Attorney

UNITED STATES PATENT OFFICE.

HENRY STRAWSON, OF BRADLEY, ILLINOIS.

NON-REFILLABLE BOTTLE.

SPECIFICATION forming part of Letters Patent No. 606,309, dated June 28, 1898.

Application filed June 21, 1897. Serial No. 641,635. (No model.)

*To all whom it may concern:*

Be it known that I, HENRY STRAWSON, of Bradley, in the county of Kankakee and State of Illinois, have invented certain new and useful Improvements in Non-Refillable Bottles; and I do hereby declare the following to be a full, clear, and exact description of the invention, such as will enable others skilled in the art to which it appertains to make and use the same.

My invention relates to non-refillable bottles; and its object is to provide an improved form of non-refillable bottle which will be of simple and cheap construction.

My invention consists of certain novel features, constructions, and combinations of parts, hereinafter more fully described and claimed.

Figure 1:
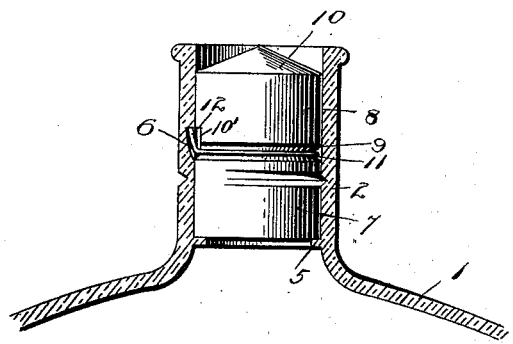
Figure 2:
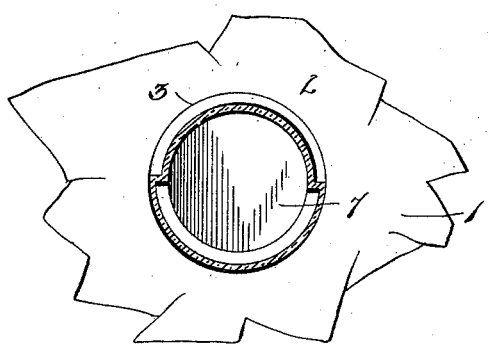
Figure 3:
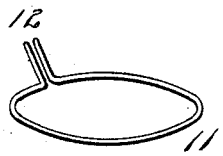

In the accompanying drawings, Figure 1 is a section through the neck of a bottle, showing my device in position. Fig. 2 is a section through the breaking-groove. Fig. 3 is a detail perspective view of my spring.

Numeral 1 indicates the body of the bottle, which is provided with a neck 2 and a groove 3, extending around said neck about half-way of circumference thereof, as plainly shown in Fig. 2. There are thus formed internal and external breaking-grooves, each extending half-way. A bottle provided with a neck such as this would be more easily broken than one in which the two grooves extend entirely around the neck, as these grooves could be made deeper. Shoulders 5 are formed within said neck, at the lower end thereof. A notch 6 is formed in one side of said neck above the breaking-groove. A stopper 7 is inserted in the neck below said breaking-groove, its downward motion being limited by said shoulders. A stopper 8, having a groove 9 therearound, is held in the upper part of said neck. I preferably provide this stopper with a conical top 10 and make it of such dimensions that when inserted said top will be below the plane of the top of the bottle-neck. I do this in order that after insertion the circular depression formed by said conical top may be filled with sealing-wax or other suitable material. A spring 11, having upwardly-bent ends 12, is held around said stopper. The upwardly-bent ends fit in a recess 10', extending from the groove therearound. Said recess is deep enough to permit the retraction of said ends therein when said stopper is inserted; but by reason of the resiliency of the metal of which the spring is composed the ends will fly out when the notch in the side of the neck is reached and will lock said stopper securely in place.

I thus provide a simple and efficient means for accomplishing the purpose indicated, which may be manufactured at low cost and without the use of special skill, and it is understood that the whole device may be manufactured in any manner desired which will best accomplish the object, and my patent shall not be limited to the exact form of parts and the minute arrangement thereof, as shown and described, and I reserve the right to make such alterations and modifications as fairly come within the scope of this invention.

Having thus described my invention, what I claim as new, and desire to secure by means of Letters Patent, is—

1. In combination with a bottle, a neck provided with an external breaking-groove extending approximately half-way therearound, and an internal breaking-groove extending approximately the remainder of the distance therearound.

2. In combination with a bottle, a neck provided with an external breaking-groove extending approximately half-way therearound, an internal breaking-groove extending approximately the remainder of the distance, and shoulders formed beneath said breaking-grooves, a stopper held against said shoulders beneath said breaking-grooves, and a sealing device held above said stopper.

3. In combination with a bottle, a neck having shoulders formed at the lower end thereof, an external breaking-groove extending approximately half-way around said neck, an internal breaking-groove extending approximately the remainder of the distance, and a notch formed on the inside of said neck adjacent to and communicating with said internal breaking-groove to rest against said shoulders, a stopper provided with an annular groove held in the upper portion of said neck above said breaking-grooves, and a spring consisting of a piece of resilient metal formed to fit the annular groove in the stopper and provided with ends extending up into the recess, said ends normally pressing outwardly therefrom.

In testimony whereof I have signed this specification in the presence of two subscribing witnesses.

HENRY STRAWSON.

Witnesses:
 B. S. FORD,
 HATTIE E. FORD.